United States Patent [19]
Schoenberger

[11] 3,909,972
[45] Oct. 7, 1975

[54] COLLAPSIBLE SHRIMP NET ACCESSORY FOR BOATS

[76] Inventor: Simon Ray Schoenberger, 1806 Bridge City Ave., Bridge City, La. 70094

[22] Filed: Nov. 25, 1974

[21] Appl. No.: 526,587

[52] U.S. Cl. ............................................. 43/8; 43/8
[51] Int. Cl.² ................................. A01K 73/04
[58] Field of Search ........................... 43/8, 4.5, 9

[56] References Cited
UNITED STATES PATENTS

| | | | |
|---|---|---|---|
| 257,597 | 5/1882 | Long | 43/8 |
| 1,287,061 | 12/1918 | McGregory | 43/8 |
| 1,304,302 | 5/1919 | Gage, Sr. | 43/8 |
| 2,570,285 | 10/1951 | Sundberg | 43/8 |

Primary Examiner—Louis G. Mancene
Assistant Examiner—Daniel J. Leach
Attorney, Agent, or Firm—Pugh & Laiche

[57] ABSTRACT

A collapsible shrimp net accessory for standard, recreational type pleasure boats including two side, wing-type nets which can be folded forwardly 90° for storage alongside the forward bow portion and, when in wing disposition, can be raised and lowered by winches in a vertical, lateral plane for proper operation. Each net also includes a telescoping connection which allows the nets to be raised and lowered. A locking clamp is mounted at the forward bow section of the boat to engage the net when the net is pivoted forwardly for storage.

13 Claims, 5 Drawing Figures

COLLAPSIBLE SHRIMP NET ACCESSORY FOR BOATS

BACKGROUND OF THE INVENTION

The present invention relates to an adjustable device and method for removably attaching small trawling seines or wing nets to powered recreational craft of various sizes for the purpose of fishing for shrimp, fish and other pelagic life.

There are several hundred species of shrimp. The catch of species of Penaeus probably exceeds that of all other crustacean fisheries in magnitude and importance. The world's greatest shrimp fishery, based principally on species of Penaeus, is in the Gulf of Mexico, where several hundred million pounds of these shellfish are taken annually by United States, Mexican and Cuban fishermen.

Shrimp are taken in a variety of ways — with hand or cast nets, baited traps, haul seines, stake or channel nets set in tideways and with boat-drawn beam and otter trawls. The trawls, which account for the major portion of the world catch, consist of large, baglike nets which are dragged over the floor of the ocean, scooping up the shrimp in their path. In shallower waters, the trawl nets are in the form of wing nets which are located on opposite sides of the vessel, and it is to this type of trawl nets that the present invention is directed.

The literature of the prior art contains many references to permanently attaching nets to larger commercial vessels for the purpose of trawling or seining for shrimp and the like. Additional custom made boats made for this purpose and restricted to this purpose are also well known.

However the present invention is designed to adapt itself to various sizes of small recreational craft of standard pleasure type design and can be easily assembled and disassembled on the craft. In particular, the present invention is directed to a purse-seine device that can be folded and transported in place on the "pleasure" craft on the highway on an ordinary boat trailer.

As regards the utility of the present invention, there are millions of small boat owners in this country and abroad, a substantial number of which reside in locations where seining for crustaceans, such as shrimp, is practical and legal. The present invention throws open an entire new field of activity to the small boat owner, and one that will grow in significance as the effort to exploit fresh and salt water food production is stressed here and abroad.

Thus, a highly important object of the present invention is to provide an apparatus of the aforementioned character which may be installed for use on all size boats or pleasure craft with a minimum of effort and tools.

Still another important object of the invention is to supply a set of wing nets of the character described which will permit a single person to completely remove the entire apparatus from the boat in a matter of minutes and can be remounted in the same manner.

Still another important object of the present invention is to provide an apparatus which is readily adjustable to meet various conditions and which is comparatively simple in construction, strong, durable, of light weight and which may be manufactured at relatively low cost.

In seining for shrimp and the like using the present invention, two nets are lowered into the waters by winches and deployed to either side of the craft in a perpendicular fashion in "wing conformation." They are then pulled through the water at a suitable speed by the powered boat. When the seining run is completed, the catch is secured by raising the nets partially out of the water by means of separate manual winches. The nets may then be secured by folding them forward on hinges towards the front of the craft and securing them there by means of special latches at this point, leaving the craft in condition to be used for pleasure. With the wing nets folded and secured, the boat may be removed from the water and placed on its trailer in the usual fashion, and transported on the highway.

Once out of the water, the entire rig, with the exception of three permanently-secured cleats, may be removed or disassembled in a matter of minutes by one man; similarly, one man can assemble the rig in a matter of minutes.

The present invention has been reduced to actual practice and found to work satisfactorily in the manner generally described above and detailed below.

The general objects of the present invention thus are as follows: to provide a means whereby the small boat owner can temporarily convert his craft into a small purse-seiner; to allow the small craft owner to transport his purse-seiner on the highway in the same manner he would his boat alone; to supply a set of economical wing nets of suitable design for the aforementioned seining operation; to provide for easy assembly or attachment of the device and wing nets to the craft by one man, as well as easy and quick removal by one man; and in general to provide an economical aid to fresh water and marine scientists, State, Federal and other agencies concerned with fisheries, conservation, and other aspects of marine life in fresh and salt water.

BRIEF DESCRIPTION OF THE DRAWINGS

For further understanding of the nature and objects of the present invention, reference should be had to the following detailed description, taken in conjunction with the accompanying drawings, in which like parts are given like reference numerals and wherein:

FIG. 5 is a close-up view of a tension clamp used to secure the front end of the net (when in its fully folded, stored disposition) to the bow of the boat.

DESCRIPTION OF THE PREFERRED EMBODIMENT

Figure 1:
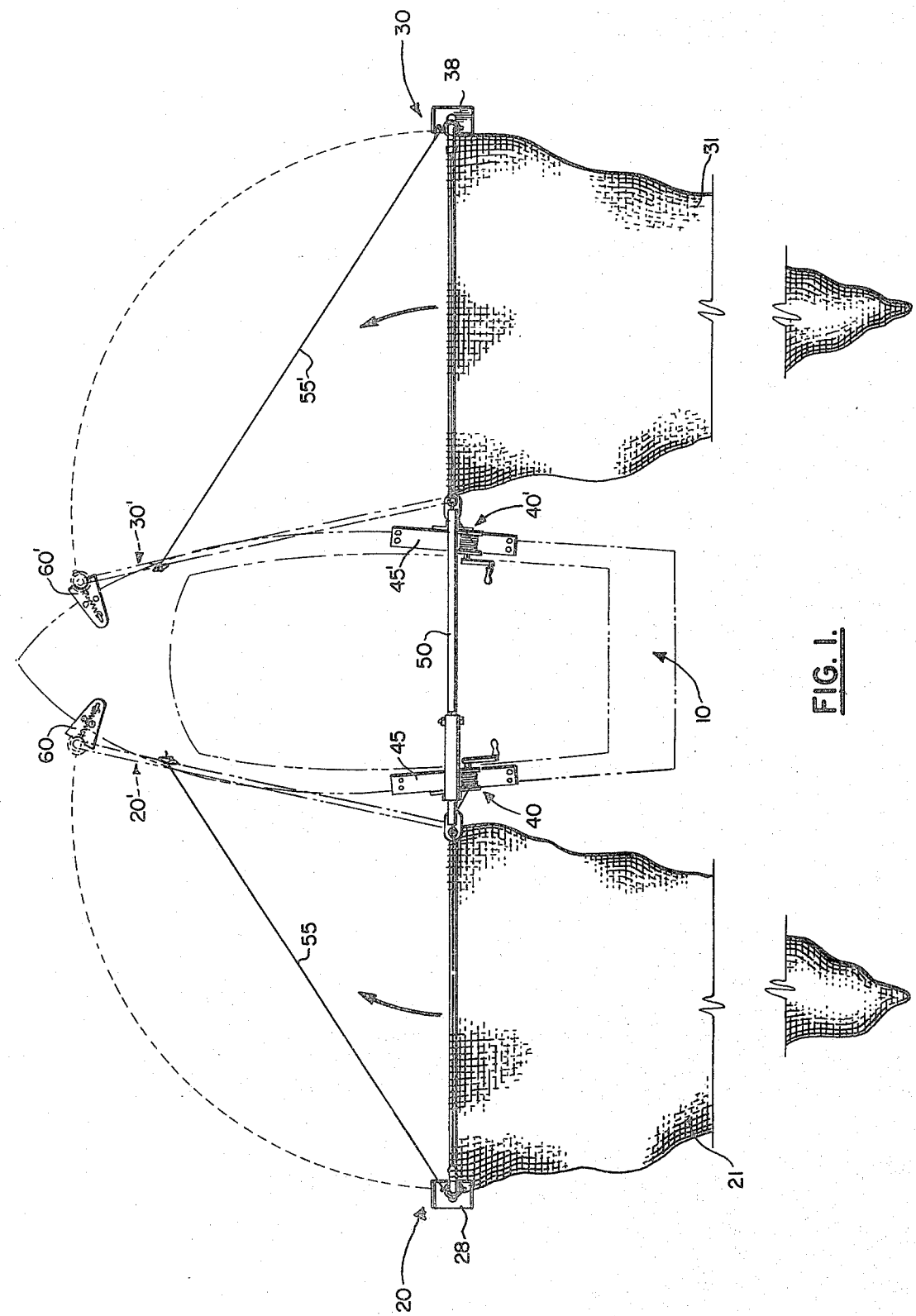
FIG. 1 is an overall top view of an ordinary outboard motor boat with a partial view of the preferred embodiment of the wing seine nets of the present invention deployed on either side and held in place by cables, with the position of the nets when being folded forward being shown by phantom lines.
Figure 2:
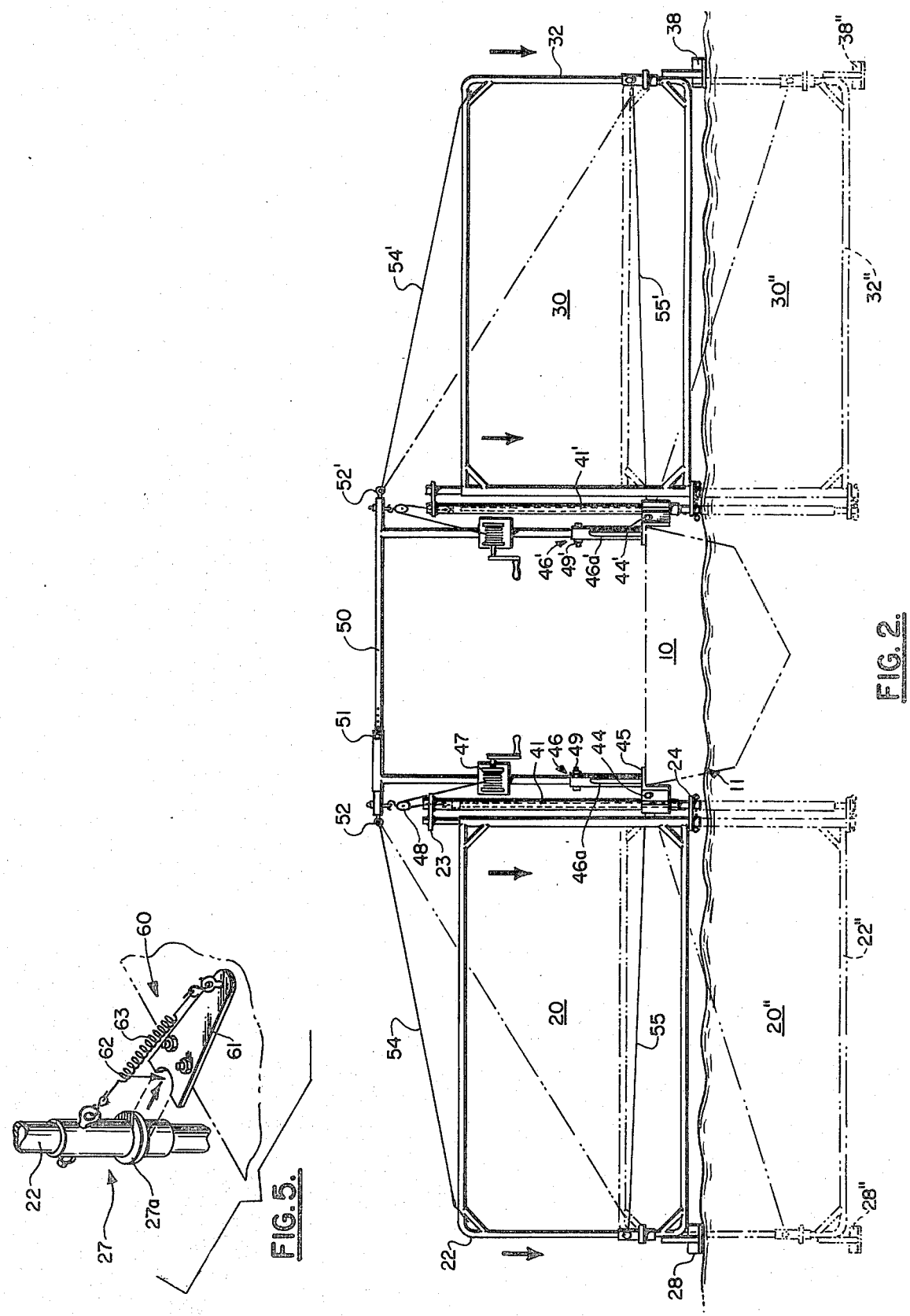
FIG. 2 is a rear view of the boat with the nets of the present invention in a raised position, the lowered or working position of the nets being shown in phantom lines.
Figure 3:
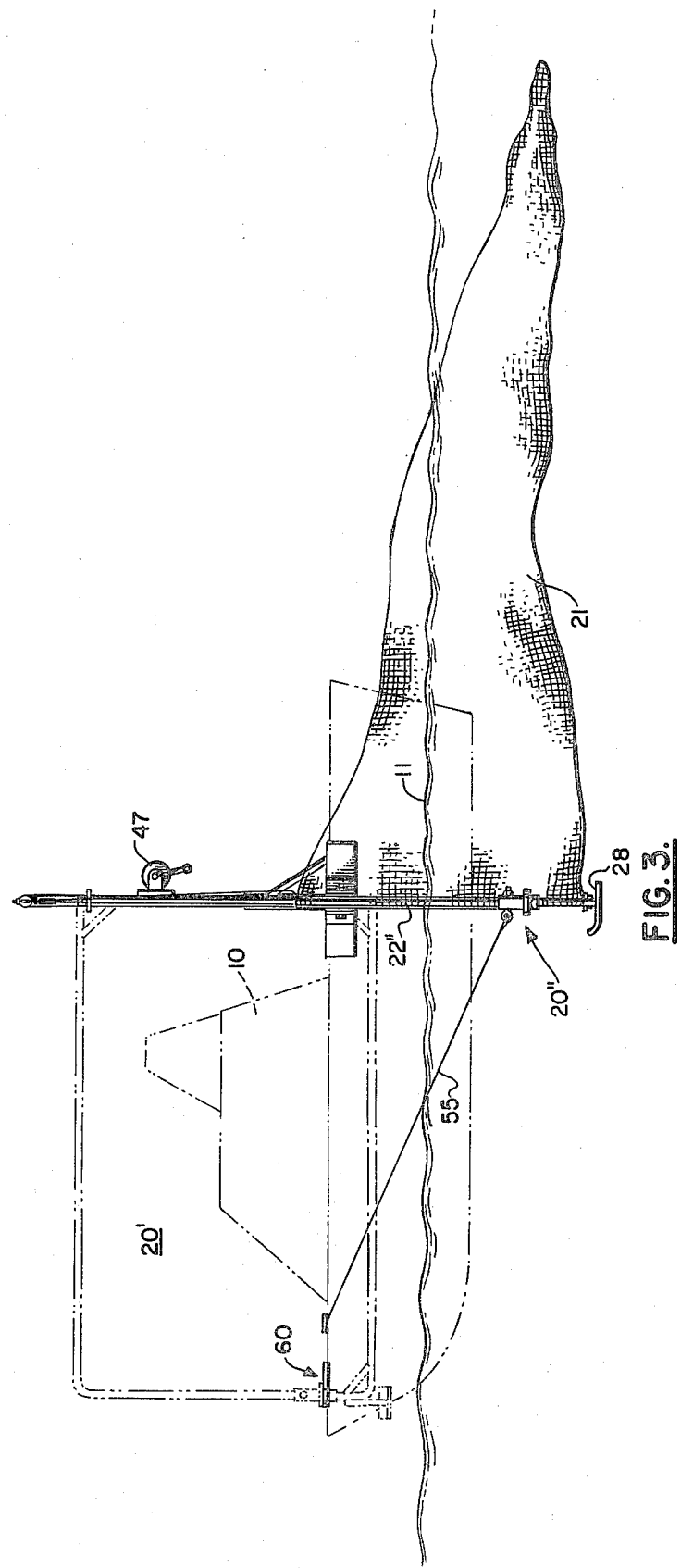
FIG. 3 is a side view of the boat with the nets in the completely lowered position, the folded, non-operative position of the nets being shown in phantom lines.

As best shown in FIGS. 1–3, the apparatus which forms the preferred embodiment of the present invention includes two wing nets in raised position 20, 30, disposed on opposite sides of a standard, conventional recreational or pleasure-type craft 10. The wing nets 20, 30 are substantially identical (one being the "mirror image" of the other) and comprise gate rack frames 22, 32 of suitable metal tubing (e.g. aluminum) having seine nets 21, 31 attached thereto and trailing therefrom.

The wing nets are mounted so that they can be raised out of the water, lowered into the water, and also stored in a forward, inoperative position. It is noted that the wing nets are shown in their raised position 20, 30 in FIGS. 1 and 2, their stored position 20', 30' in FIG. 1 and 3 (note phantom lines), and in their lowered, operative position 20'', 30'' in FIGS. 2 (note phantom lines) and 3.

The wing nets are mounted to the boat 10 by means of hinge-telescoping assembly connections 40 (shown in isolated close-up in FIG. 4), 40' which allow the wing nets to be moved up or down in a vertical dimension (note straight arrows) and swing (not curved arrows) forward in the parallel, stored position and out in the wing position perpendicular to the hull. It is noted that the hinge-telescoping connections 40, 40' are substantially identical, with one being the "mirror image" of the other.

The wing net frame 22 is connected to the pivot pipe 41 by means of flanges 23, 24 and telescoping pipe sections 25, 26, the latter of which telescopically mate with the inboard pipe frame member 22 and the pivot pipe 41, respectively. This telescoping connection allows the vertical positions of the wing nets to be varied as desired, as explained more fully below.

Reinforcing member 27 is provided on the outboard, tubular frame member 22 to which is fixed cable 55 by means of an eye bolt. A circular flange or ring 27a is provided on the reinforcing member 27 to mate with the bow clamp 60, as described more fully below.

The pivot pipe 41 is in turn pivotably and telescopically connected to the flange coupling 42 which allows the pivot pipe 41 to pivot with respect to it for the swinging action (note curved arrow near element 23) of the net and to vertically move up and down for the supplemental raising and lowering of the net (note straight arrows near element 42). This vertical movement is used as a further vertical adjustment as a supplemental to other vertical telescoping movement between the telescoping pipe sections 22–25 and 26–41, described more fully below.

The pivot pipe 41 thus is attached to the boat 10 through the swing flange couplings 42, 43 and bracket 45, which is fixedly attached by for example bolts (not illustrated) to the port side of the boat 10. The flange couplings 42, 43 are bolted together by pivot bolt 44 which allows the combined wing net and pivot pipe 41 to be pivoted up with respect to the boat 10 around pivot bolt 44 in a vertical plane, to allow vertical skewing of the wing net.

Attached to the same bracket 45 is a vertical pole assembly 46 onto which a manual, ratcheted winch 47 is mounted. The winch line 48 is attached to the upper eyelet portion 26b of the inner telescoping pipe section 26 through cap bushing 26a, all of which are fixedly attached together.

By winding up or letting out the manual winch 47, the wing net is raised or lowered respectively, its own weight being sufficient to cause it to move downwardly, although manual assistance is often helpful.

It should be noted that the flange 23 is welded to the two, separate telescoping pipe sections 25 and 41, while the flange 24 is removably attached to the two, separate telescoping pipe sections 22 and 26, being held on the latter sections by means of pin bolts 22' and 26', respectively. However, it should be noted that the lower flange plate 24 could just as well be welded to the pipe section 22 for greater structural rigidity, but having the pin connection 22' does allow for maximum disassembly of the parts. In the latter vein, the upper flange 23 could be connected to either or both the pipe sections 25, 41 by appropriate pin connections rather than by welding as shown. Also included within and fixedly attached to the telescoping pipe section 41 at the bottom thereof is a fixed bushing 41a which is of a similar but slightly larger overall diameter than cap bushing 26a; hence the fixed bushing 41a prevents the top end of the inner pipe section 26 from passing out of the outer telescoping pipe section 41, by bushing 41a contacting cap bushing 26a.

It should be further noted that in actual practice the bottom of the outer telescoping pipe section 41 will always rest on the bottom flange 24, rather than there being a slight gap as illustrated, for clarity purposes, as long as the pipe section 41 is free to move vertically through the sleeve 42a. As to the latter, if it is desired to eliminate the supplemental lowering allowed by pipe section 41 moving through sleeve 42a, set screw (not illustrated) or other suitable mechanical means could be provided to prevent any such relative telescoping movement.

Figure 4:
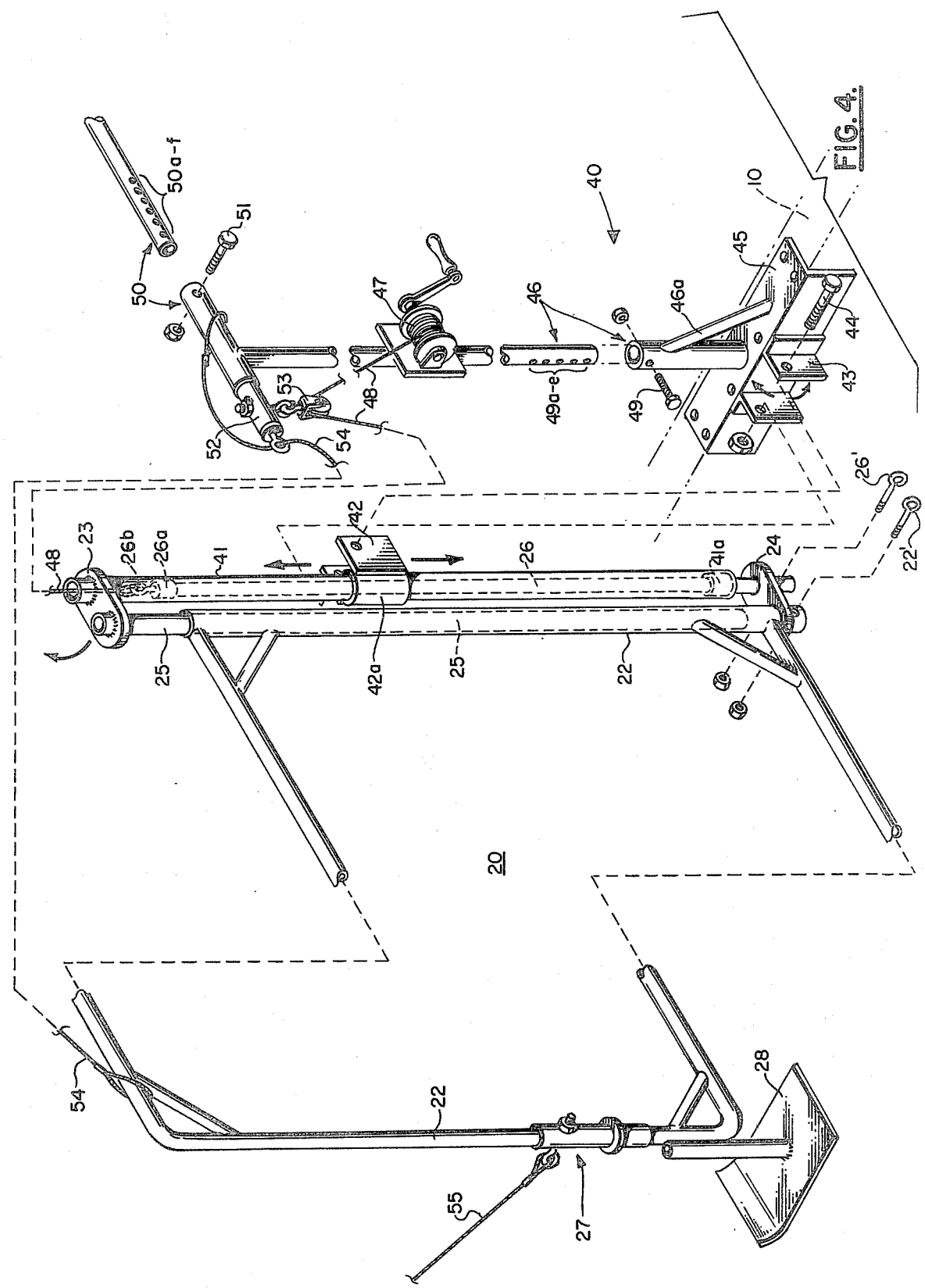
FIG. 4 is an isometric view of the hardware of the net rig of the preferred embodiment of the invention used to perform the operations of attaching the rig to the boat; holding the mouth of the nets open; raising and lowering the nets; holding them perpendicular to the boat while seining; and folding the nets after use into a stored position.

Thus, when the manual winch 47 begins to let out the line 48, the wing net will be initially lowered by means of the pipe section 41 moving down through sleeve 42a, while the two sets of telescoping pipe sections 22–25 and 26–41 remain generally in the same positions relative to each other as illustrated in FIG. 4. Then, upon the upper flange 23 contacting the sleeve 42a, preventing further relative movement between the two, the telescoping pipe sections 22 and 26 continue to move lower relative to the pipe sections 25 and 41, respectively, until the desired level is reached or until the cap bushing 26a contacts the lower, fixed bushing 41a, at which point the wing net is at its lowest possible point with respect to its attachment to the boat 10 at coupling bolt 44. Of course, when the wing net is raised by the winch 47, the relative movement of the parts occurs in the opposite fashion; that is, the pipe sections 22 and 26 move up until lower flange 24 contacts the bottom of pipe section 41, which then also moves up until the desired level is reached or until flange plate 24 contacts sleeve 42a, at which point the wing net is at its highest possible point with respect to its attachment to the boat 10 at coupling bolt 44.

Should it ever be desired to completely or partially remove the wing net assembly from the boat 10 or separate out its parts for example replacement or repair, one need only remove the pin 26' and the entire gate structure of the wing net can be removed. Additionally then, if desired, the inner pipe section 26 can be removed up and out of the pipe section 41 of the boat attachment assembly; and then, if desired, the pipe section 41, along with flange 23 and pipe section 25, can be removed up and out of the sleeve 41a. Of course, removal of the longitudinally pivot bolt 44 would allow removal of the whole wing net assembly in one unit.

Referring back to FIGS. 2 and 4, a lateral support assembly 50 is attached to the vertical support assembly 46, 46'. The vertical and lateral support assemblies 46, 46', 50 are comprised of telescoping sections with pin bolt and hole connections (note for example pin bolts 49, 51 and mating holes 49a–e, 50a–f of FIG. 4) to allow the over-all support assembly to have relatively "universal" application for various size and configured boats, greatly enhancing the flexiblity of the apparatus.

At their outboard ends, the wing nets include skids or sled elements 28, 38 which serve as buffers when the nets are lowered. Should the boat 10 be operating in shallow waters or come upon a sand bar, the skids 28, 38 will cause the nets 20'', 30'' to relatively smoothly ride up over the bottom. The pivot bolt 44 and flange couplings 42, 43 also allow the nets to skew up if necessary when the nets through the skids contact the bottom. Supplemental skids (not illustrated) could also be provided at intermediate points along the bottom of the nets if so desired.

In order to help support the nets when positioned out in their "wing conformation," support lines 54, 54' are provided from the lateral tips 52, 52' of the lateral support member 50 to the tops of the outboard ends of the wing nets. Because the distance between the top of the outboard end of each wing net and its associated lateral tip (52, 52') is greater when the wing net is lowered (compare the phantom line counterparts to lines 54, 54' of FIG. 2), it is desirable to loop the inboard ends of the lines 54, 54' through the eyelets at the lateral tips 52, 52' and then over the lateral support pipe 50 (note FIG. 4).

The positions of the terminal inboard loop in the lines 54, 54' on the lateral support pipe 50 can be variably fixed by means of appropriately placed pins (not illustrated) in the laterally spaced holes 50a–f. Additionally support lines 55, 55' are run from the port and starboard sides of the bow back to the lower portions of the outboard, frame members 22, 32. The support lines 54, 54' and 55, 55' can be, for example, hundred pound line and enhance the safe use of the apparatus and help distribute the stresses which would otherwise be concentrated on collar 42a, flange couplings 42, 43, pivot bolt 44 and bracket 45 (and their counterparts on the starboard side). The support lines 55, 55' also to some degree serve to limit the maximum amount the wing nets can be swung back (note FIG. 1).

As noted above, the wing nets are hinged and hence free to rotate about the vertical axis formed by the pivot pipe 41. When it is desired to stow the wing nets away after use, they are raised to the top vertical positions (20, 30) and swung forward (note dashed, curved lines in FIG. 1) substantially parallel to the beam of the boat 10 to their stowed positions 20', 30'. The forward action can be caused by pulling on lines 55, 55' and/or manually rotating the inboard frame members 22, 32 and pivot pipes 41, 41'.

As best illustrated in FIGS. 1 and 5, two special latching clamps 60, 60' are provided on the port and starboard bow sections. The clamp 60 includes a metal plate member 61 having a circular indentation 62 therein designed to mate with the coupling collar 27 on the outboard, frame member 22. A spring tension member 63 is included to lock and hold the frame member 22 into the clamp indentation 62 for storage and transportation. A stabilizing ring 27a is included on the collar 27 and sits on top of the plate 61 when the net is stored, its presence preventing the collar 27 from moving down through the indentation 62. The nets 21, 31 are pulled through the frames and stowed on the bow deck.

When in their storage disposition (20', 30'), the net frames do not add any substantial, additional bulk to the boat 10, and hence the boat 10, with the nets attached in their stowed position, can be land transported over the highways on the standard boat trailer.

When it is desired to remove the apparatus from the boat 10, one need only to unlock the clamps 60, 60', and remove the bolts 44, 49, 51 and their port counterparts 44', 49'. The only hardware items left on the boat 10 are the clamp plates 61 and the brackets 45, 45' with their affixedly attached, lower vertical support sections 46a, 46a' and their flange couplings 43, 43'.

To reassemble the apparatus, the disassembly steps are reversed. Likewise to change from storage disposition to the wing disposition, the net frames are unlocked from their clamps 60, 60' and rotated aft to their wing position. They are then lowered by the winches 47, 47' to a suitable depth below the water line 11. Normally the upper, top frame member is located right at the water line 11 during trawling operation.

To prevent the net frames 22, 32 from rotating past their perpendicular wing position, suitable projections, keys or stop (not illustrated) could be included between the pivot pipe 41 and collar 42a to limit the rotation and indeed to lock it in position to prevent the nets from "flapping around." Many mechanical systems well known to those skilled in the art are available for such use.

The boat 10 can be of any standard type including pleasure boats of the recreational type, such as runabouts, speedboats, sportsman fishing boats, etc., both inboard or outboard or of the I/O type. Of course, the accessory of the present invention could also be applied to commercial fishing boats, but it is believed the primary advance in the useful arts is in opening up the possibility of using standard pleasure craft for shrimping purposes.

As is perhaps true of almost all mechanical systems, the variations possible of the details of the particular structure shown and described for the preferred embodiment are almost limitless. For one example, in order to increase the effective face or opening of the net frame into the net, flap sections could be included along the top, bottom and/or the outboard edge which could be folded out during use of the apparatus but folded back in during storage in order not to increase the over-all bulk or size of the frame during transportation. Of course many other variations are possible.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A collapsible and removable shrimp net accessory for standard type boats including pleasure boats of the recreational type comprising:
   at least one wing net assembly having a frame for supporting a trawling net with the entrance thereto in open disposition to ultimately catch shrimp and the like when in trawling position;
   mounting assembly means for mounting said wing net assembly on to the side of the boat, at least the bulk of said mounting assembly means being easily removable from the boat after attachment thereto; and
   connection means for connecting said wing net assembly to said mounting assembly means; said connection means including:
      a pivot section which allows said wing net assembly to be pivoted about an axis vertical to the boat for movement of said wing net assembly between a position athwarthship to a position lengthwise of the boat and positions intermediate thereto; and
      a vertically movable section which allows said wing net assembly to be moved up and down in a plane vertical to the boat for movement of said wing net assembly in a plane vertical to the boat between a position above the water line of the boat to a position below the water line of the boat and positions intermediate thereto; the wing net assembly being locatable in operative shrimping position by positioning said wing net assembly athwarthship by means of said pivot section and below the water line by means of said vertically movable section, and being locatable in inoperative storage position without adding any great additional bulk to the boat by positioning said wing net assembly above the water line by means of said vertically movable section and lengthwise of the boat by means of said pivot section.

2. The shrimp net accessory of claim 1 wherein said connection means further includes:
   a skewing section which allows said wing net assembly to be pivoted about an axis parallel to the longitudinal axis of the boat, allowing said wing net assembly to skew up should the wing net assembly touch the water bottom.

3. The shrimp net accessory of claim 1 wherein said pivot section and said vertically movable section are combined into the same structure and comprise at least one set of telescoping, concentric pipe section, the outer one rotatable about the inner one and being vertically movable with respect to one another by telescoping action between the two.

4. The shrimp net accessory of claim 1 wherein said vertically moveable section includes at least two, separate telescoping, concentric pipe sections connected together, the inner one of one set of concentric pipe sections being fixedly attached to the outer one of the other set, one set of which includes a third concentric telescoping pipe section which is outer to the other two pipe sections of the set, each set allowing separate relative vertical movement of said wing net assembly.

5. The shrimp net accessory of claim 4 wherein said set which includes said third concentric telescoping pipe section is inboard to the other set, and wherein said connection means further includes a skewing section which allows said wing net assembly to be pivoted about an axis parallel to longitudinal axis of the boat, allowing said wing net assembly to skew up should said wing net assembly touch the water, said skewing section being directly connected to said third concentric telescoping pipe section.

6. The shrimp net accessory of claim 5 wherein the outer pipe section of the outboard set is fixedly connected to the most inner pipe section of said inboard set, and the inner pipe section of said outboard set is fixedly connected to the center pipe section of said inboard set.

7. The shrimp net accessory of claim 6 wherein said center pipe section includes bearing means at its bottom for preventing the top of its inner pipe section from moving out through its bottom and flange means at its top for preventing its own top from moving out through said third pipe section.

8. The shrimp net accessory of claim 7 wherein a manual winch is included on said mounting assembly means with a winch line going down to the top of said innermost pipe section, said wing net assembly being lowered by lowering said winch line until said flange means contacts the top of said third pipe section and then further lowered until the top of said innermost pipe section contacts said bearing means, and said wing net assembly being raised in opposite fashion.

9. The shrimp net accessory of claim 1 wherein there is included two sets of wing net assembly means, and two sets of connection means, each set being substantially identical to the other with one being the "mirror image" of the other, one set of sets being for the starboard side of the boat and the other for the port side.

10. The shrimp net accessory of claim 9 wherein said mounting assembly means of each set includes a vertical support pole upon which the winch is mounted, and wherein there is further included a lateral support bar means for connection between said two vertical support poles to laterally stabilize and strengthen them.

11. The shrimp net accessory of claim 10 wherein said two vertical support poles and said lateral support bar include telescoping section to allow flexibility in dimensional location.

12. The shrimp net accessory of claim 10 wherein a set of support lines are strung from the top of said vertical support poles to the outboard ends of said wing net assemblies and a supplemental set of support lines is strung from the bow of the boat to the outboard ends of said wing net assemblies.

13. The shrimp net accessory of claim 1 wherein there is further included clamping means for location near the terminal end (bow/stern) of the boat for locking said wing net assembly in its raised, lengthwise inoperative position, said clamp means having a semi-circularly-shaped indention therein at its outboard end, the outboard end of said wing net assembly being formed at least in part of a tubular section near its lower extremity with a flange section extending out therefrom, said tubular section mating with said indentation with said flange section riding right above the top of said clamping when said wing net assembly is clamped to said clamping means.

* * * * *